US011074797B2

(12) United States Patent
Heintzelman et al.

(10) Patent No.: US 11,074,797 B2
(45) Date of Patent: Jul. 27, 2021

(54) BUILDING HEALTH ANALYSIS AND MANAGEMENT SYSTEM

(71) Applicant: Ademco Inc., Golden Valley, MN (US)

(72) Inventors: Christopher Heintzelman, Plymouth, MN (US); Brian Beale, Woodbury, MN (US); David J. Emmons, Plymouth, MN (US); Joseph Bodkin, South Burlington, VT (US); John Cronin, Jericho, VT (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/294,874

(22) Filed: Mar. 6, 2019

(65) Prior Publication Data

US 2020/0286350 A1 Sep. 10, 2020

(51) Int. Cl.
*G08B 19/00* (2006.01)

(52) U.S. Cl.
CPC .................................... *G08B 19/00* (2013.01)

(58) Field of Classification Search
CPC .... G08B 19/00; G08B 25/008; G08B 17/107; G08B 25/002; G08B 21/02; G08B 21/10; G08B 21/12; G05B 2219/2614; G05B 19/0428; G05B 19/048; G05B 2219/24015; G05B 2219/24024; G05B 2219/24097; G06Q 50/163
See application file for complete search history.

(56) References Cited

U.S. PATENT DOCUMENTS 7,768,412 B2 8/2010 Vokey
8,172,154 B1 5/2012 Figley et al.
8,988,232 B1 * 3/2015 Sloo .......................... F24F 11/30 340/602
2007/0112520 A1 5/2007 Marrocco
2011/0047418 A1 * 2/2011 Drees ..................... G05B 15/02 714/57
2013/0226352 A1 * 8/2013 Dean-Hendricks ...... F24F 11/30 700/276

(Continued)

FOREIGN PATENT DOCUMENTS

JP 4969886 B2 7/2012

OTHER PUBLICATIONS

Yun et al., "Building Environment Analysis based on Temperature and Humidity for Smart Energy Systems," Sensors, pp. 13458-13470, Oct. 1, 2012.

(Continued)

*Primary Examiner* — Thomas S McCormack
(74) *Attorney, Agent, or Firm* — Shumaker & Sieffert, P.A.

(57) ABSTRACT

A monitoring system for monitoring a status of a building comprising a first sensor configured to detect a first condition in the space and a second sensor configured to detect a second condition in the space is disclosed. The system may further comprise a memory for storing one or more rules each configured to identify one or more issues in the space based on the first and/or second conditions in the space and a communications module configured to communicate with a remote device over a network. A controller may be configured to apply the one or more rules to the first and second detected conditions in the space to identify the one or more issues and provide a notification to the remote device via the communications module.

19 Claims, 10 Drawing Sheets

(56) References Cited

U.S. PATENT DOCUMENTS

| | | | | |
|---|---|---|---|---|
| 2014/0031989 | A1 | 1/2014 | Bergman et al. | |
| 2017/0076263 | A1* | 3/2017 | Bentz | H04W 4/80 |
| 2017/0124853 | A1* | 5/2017 | Mehta | H04W 4/90 |
| 2018/0375680 | A1* | 12/2018 | Wright | G08B 25/10 |
| 2019/0278809 | A1* | 9/2019 | El Kaed | G06F 16/24568 |

OTHER PUBLICATIONS

Kyriazakos et al., "Novel Building Management System based on Machine Learning and a Cloud-based SOA for Ambient Living," 5 pages, 2014.

* cited by examiner

400

| Building ID (402) | Date (404) | Time (406) | Sensor (408) | Data (410) |
|---|---|---|---|---|
| OC123 | 6/11/2018 | 9:00am | Humidity | 45% |
| OC123 | 6/11/2018 | 9:00am | Temperature | 90 Degrees |
| OC123 | 6/11/2018 | 9:00am | Ventilation | 25% |
| OC123 | 6/11/2018 | 9:00am | Air Duct Temperature | 65 Degrees |
| - | - | - | - | - |

| | Sensor (452) | Range (454) | Duration (456) | Issue (458) |
|---|---|---|---|---|
| 460a | Humidity | 60%+ | Any | mold |
| 460b | Indoor Temperature | 50 or below and low humidity | one hour | Damaged hardwood floors |
| 460c | Ventilation Sensors | Deactivated with humidity 50+ | one hour | increased humidity inside |
| 460d | Air Duct Temperature | 40 Deg. difference in temp. | one hour | Condensation |
| 460e | Fire sensor | Detected | Any | potential fire |
| 460f | Gas sensor | Detected | Any | potential gas leak, fire, explosion |
| | - | - | - | - |
| | - | - | - | - |
| | - | - | - | - |
| | - | - | - | - |
| | - | - | - | - |

| Building ID (602) | Date (604) | Time (606) | Sensor (608) | Data (610) |
|---|---|---|---|---|
| OC123 | 6/11/2018 | 9:00am | Humidity | 45% |
| OC123 | 6/11/2018 | 9:00am | Temperature | 90 Degrees |
| OC123 | 6/11/2018 | 9:00am | Ventilation | 25% |
| OC123 | 6/11/2018 | 9:00am | Air Duct Temperature | 65 Degrees |
| - | - | - | - | - |
| TY987 | 6/11/2018 | 9:00am | Temperature | 95 Degrees |
| TY987 | 6/11/2018 | 9:00am | Humidity | 65% |
| TY987 | 6/11/2018 | 9:00am | Air Duct Temperature | 50 Degrees |
| - | - | - | - | - |
| - | - | - | - | - |
| - | - | - | - | - |
| - | - | - | - | - |
| - | - | - | - | - |
| - | - | - | - | - |

FIG. 10

BUILDING HEALTH ANALYSIS AND MANAGEMENT SYSTEM

TECHNICAL FIELD

The disclosure generally relates to building monitoring systems, and more particularly to systems and methods for monitoring equipment in or near a building.

BACKGROUND

Building Automation Systems (BAS) and/or various home control systems are used to control one of more functions of a building or home. A Building Automation System and/or a home control system can include, for example, an HVAC system, a lighting control system, a fire suppression systems, a security system, and/or any other suitable building automation system. A Building Automation System and/or home control systems typically include one or more sensors and/or other devices that are operatively coupled to a central controller or the like, often via wireless communication. These sensors and/or devices may be used to monitor parameters within the building or home, including, but not limited to, temperature, humidity, motion, etc.

What would be desirable are improved methods and systems for monitoring the health and status of the components of a building automation system.

SUMMARY

This disclosure generally relates to systems and method for monitoring the health and status of a building and/or the components of a building automation system.

In a first example, a method for monitoring a status of a building, wherein the building includes one or more sensors each detecting a sensed condition, may comprise storing two or more rules. Each rule may define a rule defined event and an issue that occurs if said rule defined event occurs over a predefined length of time. The method may further comprise monitoring the one or more detected events or sensed conditions of the one or more sensors over time, repeatedly applying the two or more rules to the one or more sensed conditions of the one or more sensors to identify when a rule defined event of the two or more rules occurs, and issuing a notification to a user, the notification including the rule defined event and the issue associated with said rule defined event.

Alternatively or additionally to any of the examples above, in another example, the rule defined event for at least one rule may comprise a humidity reading over a threshold for a predetermined length of time.

Alternatively or additionally to any of the examples above, in another example, the rule defined event for at least one rule may comprise a temperature reading over a threshold for a predetermined length of time.

Alternatively or additionally to any of the examples above, in another example, the rule defined event for at least one rule may comprise a temperature reading under a threshold for a predetermined length of time in combination with a humidity under a predetermined value.

Alternatively or additionally to any of the examples above, in another example, the one or more sensors may comprise a humidity sensor, a temperature sensor, a gas sensor, and/or a smoke detector.

Alternatively or additionally to any of the examples above, in another example, the rule defined event for at least one rule may comprise a detection of a fire.

Alternatively or additionally to any of the examples above, in another example, the one or more the rule defined event for at least one rule may comprise a detection of a gas.

Alternatively or additionally to any of the examples above, in another example, the one or more sensors may include a ventilation sensor and a humidity sensors, and wherein the rule defined event for at least one rule may comprise deactivated ventilation with a humidity reading over a threshold value.

Alternatively or additionally to any of the examples above, in another example, the one or more sensors may include a temperature sensor positioned in an air duct, and wherein the rule defined event for at least one rule may comprise a temperature difference above a predetermined value over a predetermined time frame.

Alternatively or additionally to any of the examples above, in another example, the notification may further include a recommended action.

Alternatively or additionally to any of the examples above, in another example, the notification may further include contact information for a repair company.

In another example, a building monitoring system configured to be used in a space within a building may comprise a first sensor configured to detect a first condition in the space, a second sensor configured to detect a second condition in the space, a memory for storing one or more rules each configured to identify one or more issues in the space based on the first and/or second conditions in the space, a communications module configured to communicate with a remote device over a network, and a controller operatively coupled to the first sensor, the second sensor, the memory, and the communications module. The controller may be configured to apply the one or more rules to the first and second detected conditions in the space to identify the one or more issues and provide a notification to the remote device via the communications module.

Alternatively or additionally to any of the examples above, in another example, the one or more issues may include a development of mold, a build-up of condensation, a fire, a gas leak, damaged woodwork, and/or excess humidity.

Alternatively or additionally to any of the examples above, in another example, the first sensor may comprise a humidity sensor.

Alternatively or additionally to any of the examples above, in another example, the second sensor may comprise a temperature sensor.

Alternatively or additionally to any of the examples above, in another example, the first sensor and the second sensor may be located in the building, the controller and the communications module may be implemented by a remote server geographically spaced from the building, and the remote device may be a portable handheld device.

Alternatively or additionally to any of the examples above, in another example, wherein the controller may be operatively coupled to the first sensor and the second sensor at least partially over a network.

Alternatively or additionally to any of the examples above, in another example, the first sensor and the second sensor may be located in the building, the controller and the communications module may be located in the building, and the remote device may be a portable handheld device.

In another example, a server for monitoring a space of a building may comprise a memory for storing two or more rules, each rule defining a rule defined event that is detectable via one or more of sensed conditions in the space and an issue that occurs in response to the corresponding rule defined event if the sensed condition in the rule defined event persists, an input/output port for receiving one or more sensed conditions from the space, and a controller operatively coupled memory and the input/output port. The controller may be configured to monitor the one or more sensed conditions over time, repeatedly apply the two or more rules to the one or more monitored sensed conditions to identify when a rule defined event of the two or more rules occurs, and relay a notification to a user including the event and the issue defined by the rule that resulted in the rule defined event.

Alternatively or additionally to any of the examples above, in another example, the one or more sensed conditions may comprise a condition that results in a hazardous environments for an inhabitant of the space of the building or a condition that results in damage to a physical component of the space of the building.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 7 is an illustrative system building sensor database;

FIG. 8 is an illustrative system problem database

FIG. 10 is an illustrative network sensor database.

Figure 1:
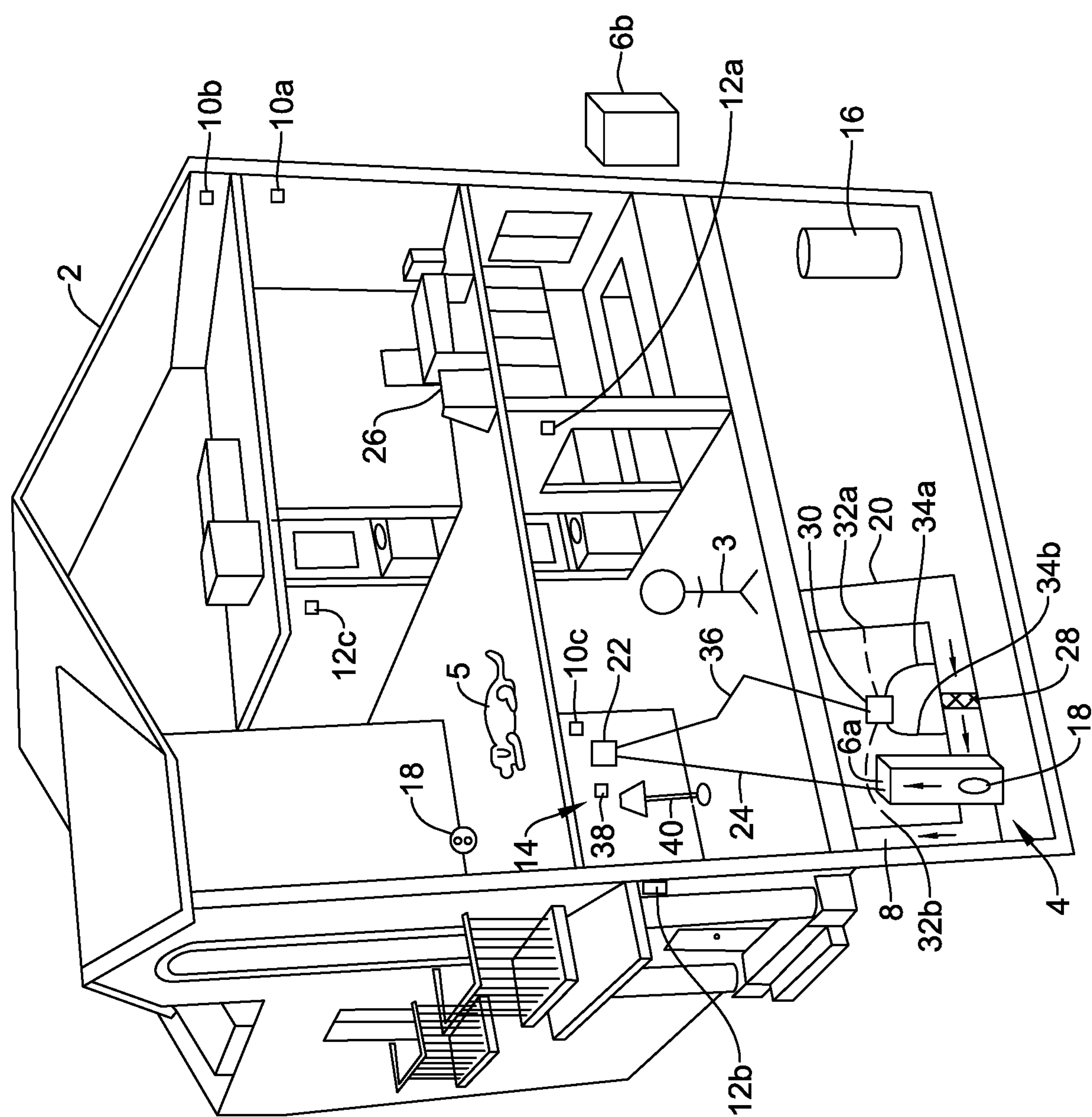
FIG. 1 is a schematic view of an illustrative building including various home automation systems.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building and/or home automation systems, and more particularly to monitoring building and/or equipment health through the building and/or home automation system. For clarity, the following description will be described with respect to a home automation system including a comfort system (e.g., an HVAC system), a security system, and/or any number of Internet of Things (IoT) devices (e.g., household devices having built-in wireless connectivity, sometimes called "smart" devices or "connected" devices), however the systems and methods described herein may be applied to commercial buildings, hotels, apartment buildings, etc. The home automation system may include one or more of an HVAC system, a lighting control system, a fire suppression system, a security system, and any other suitable home automation system devices.

FIG. 1 is a schematic view of a building 2 having an illustrative heating, ventilation, and air conditioning (HVAC) system 4 and an illustrative security system 14. The building 2 may be routinely occupied by a person or people 3 and, in some cases, one or more pets 5. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6*a*, 6*b* (collectively, 6), a system of ductwork and air vents including a supply air duct 8 and a return air duct 20, and one or more controllers 22. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

The illustrative HVAC system 4 may further include one or more sensors or devices 10*a*, 10*b* (collectively, 10) configured to measure a parameter of the environment to be controlled. The one or more sensors or devices 10 may include, but are not limited to, temperatures sensors, humidity sensors, carbon dioxide sensors, occupancy sensors, proximity sensors, etc. Each of the sensor/devices 10 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

It is contemplated that the controller(s) 22 may be configured to control the comfort level in the building or structure by activating and deactivating the HVAC component(s) 6 in a controlled manner. The controller(s) 22 may be configured to control the HVAC component(s) 6 via a wired or wireless communication link 24. In some cases, the controller(s) 22 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the controller(s) 22 may be a zone controller, or may include multiple zone controllers each monitoring and/or controlling the comfort level within a particular zone in the building or other structure. As will be described in more detail herein, the controller(s) 22 may be configured to control the security system and/or other home automation devices or to communicate with separate controllers dedicated to the security system and/or other home automation devices.

In the illustrative HVAC system 4 shown in FIG. 1, the HVAC component(s) 6 may provide heated air (and/or cooled air) via the ductwork throughout the building 2. While not explicitly shown, the HVAC component(s) 6 may be in fluid communication with every room and/or zone in the building 2 via the ductwork 8 and 20, but this is not required. In operation, when a heat call signal is provided by the controller(s) 22, an HVAC component 6*a* (e.g., forced warm air furnace) may be activated to supply heated air to one or more rooms and/or zones within the building 2 via supply air ducts 8. The heated air may be forced through supply air duct 8 by a blower or fan 17. In this example, the cooler air from each zone may be returned to the HVAC component 6 (e.g., forced warm air furnace) for heating via return air ducts 20. Similarly, when a cool call signal is provided by the controller(s) 22, an HVAC component 6*b* (e.g., air conditioning unit) may be activated to supply cooled air to one or more rooms and/or zones within the building or other structure via supply air ducts 8. The cooled air may be forced through supply air duct 8 by the blower or fan 17. In this example, the warmer air from each zone may be returned to the HVAC component 6*b* (e.g., air conditioning unit) for cooling via return air ducts 20. In some cases, the HVAC system 4 may include an internet gateway or other device 26 that may allow one or more of the HVAC components, as described herein, to communicate over a wide area network (WAN) such as, for example, the Internet.

In some cases, the system of vents or ductwork 8 and/or 20 can include one or more dampers (not explicitly shown) to regulate the flow of air, but this is not required. For example, one or more dampers may be coupled to one or more controller(s) 22, and can be coordinated with the operation of one or more HVAC components 6. The one or more controller(s) 22 may actuate dampers to an open position, a closed position, and/or a partially open position to modulate the flow of air from the one or more HVAC components 6 to an appropriate room and/or zone in the building or other structure. The dampers may be particularly useful in zoned HVAC systems, and may be used to control which zone(s) receives conditioned air from the HVAC component(s) 6.

In many instances, one or more air filters 28 may be used to remove dust and other pollutants from the air inside the building 2. In the illustrative example shown in FIG. 1, the air filter(s) 30 is installed in the return air duct 20, and may filter the air prior to the air entering the HVAC component 6, but it is contemplated that any other suitable location for the air filter(s) 30 may be used. The presence of the air filter(s) 28 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 30. When provided, the equipment interface module 30 may, in addition to controlling the HVAC under the direction of the thermostat, be configured to measure or detect a change in a given parameter between the return air side and the discharge air side of the HVAC system 4. For example, the equipment interface module 30 may measure a difference in temperature, flow rate, pressure, or a combination of any one of these parameters between the return air side and the discharge air side of the HVAC system 4. In some cases, the equipment interface module 30 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 30 may include a first temperature sensor 32*a* located in the return (incoming) air duct 20, and a second temperature sensor 32*b* located in the discharge (outgoing or supply) air duct 8. Alternatively, or in addition, the equipment interface module 34 may include a differential pressure sensor including a first pressure tap 34*a* located in the return (incoming) air duct 20, and a second pressure tap 34*b* located downstream of the air filter 28 to measure a change in a parameter related to the amount of flow restriction through the air filter 28. In some cases, the equipment interface module 30, when provided, may include at least one flow sensor that is capable of providing a measure that is related to the amount of air flow restriction through the air filter 28. In some cases, the equipment interface module 34 may include an air filter monitor. These are just some examples.

When provided, the equipment interface module 30 may be configured to communicate with the controller 22 via, for example, a wired or wireless communication link 36. In other cases, the equipment interface module 30 may be incorporated or combined with the HVAC controller 22. In either case, the equipment interface module 30 may communicate, relay or otherwise transmit data regarding the selected parameter (e.g. temperature, pressure, flow rate, etc.) to the controller 22. In some cases, the controller 22 may use the data from the equipment interface module 30 to evaluate the system's operation and/or performance. For example, the controller 22 may compare data related to the difference in temperature (delta T) between the return air side and the discharge air side of the HVAC system 4 to a previously determined delta T limit stored in the controller 22 to determine a current operating performance of the HVAC system 4.

The illustrative security system 14 may include a central controller 38 and a number of sensors/devices 12*a*, 12*b*, 12*c* (collectively, 12). While the security system controller 38 is illustrated as a separate controller from the HVAC controller 22, it is contemplated that the security system controller 38 and the HVAC controller 22 may be provided as a single controller which communicates with and controls both the HVAC system 4 and the security system 14. The sensor/devices 12 may be configured to detect threats within and/or around the building 2. In some cases, some of the sensor/devices 12 may be constructed to detect different threats. For example, some of the sensor/devices 12 may be limit switches located on doors and windows of the building 2, which are activated by entry of an intruder into the building 2 through the doors and windows. Other suitable security sensor/devices 12 may include fire, smoke, water, carbon monoxide, and/or natural gas detectors, to name a few. Still other suitable security system sensor/devices 12 may include motion sensors that detect motion of intruders in the building 2 or noise sensors or microphones that detect the sound of breaking glass. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 12 may include a video camera. In some cases, the sensor/devices 12 may include a horn or alarm, a damper actuator controller (e.g. that closes a damper during a fire event), a light controller for automatically turning on/off lights to simulate occupancy, and/or any other suitable device/sensor. These are just examples. More generally, the sensor/devices 12 may be any type of sensor or device suitable for operation in a building automation system.

During operation of the illustrative security system 14, the central controller 38 monitors the status of each of the sensor/devices 12. Upon detecting a change of status in one of the sensor/devices 12, the central controller may activate an alarm device, record and/or transmit live video from one of the sensor/devices 12, operate an actuator, contact an off-site central monitoring station (not shown), and/or perform any other suitable action.

Each of the sensor/devices 12 may be operatively connected to the central controller 38 via a corresponding communications port (not explicitly shown). It is contemplated that the communications port may be wired and/or wireless. When the communications port is wireless, the communications port may include a wireless transceiver, and the central controller 38 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The building 2 may be further provided with additional network connected or "smart" devices (e.g., WiFi enabled), also known as Internet of Things (IoT) devices. These devices may include lighting 40, home appliances 18 (such as, but not limited to, robotic vacuums, coffee pots, etc.), water heaters 16, voice activated smart speakers (e.g., AMAZON ECHO™ or GOOGLE HOME™), WiFi enabled power outlets, garage door openers, door locks, televisions, speakers, doorbells, water valves, video cameras, wearable devices, etc. Other devices in the building 2 may include, but are not limited to, a radiofrequency receiver, a thermal imager, a radar device, a lidar device, an ultrasound device, etc. It is contemplated that the additional network connected devices may be in communication with or configured to communicate or interface with the HVAC controller 22 and/or the central security controller 38. In some instances, the additional network connected devices may have one or more individual controllers which in turn communicate with the HVAC controller and/or the security controller 38.

Figure 2:
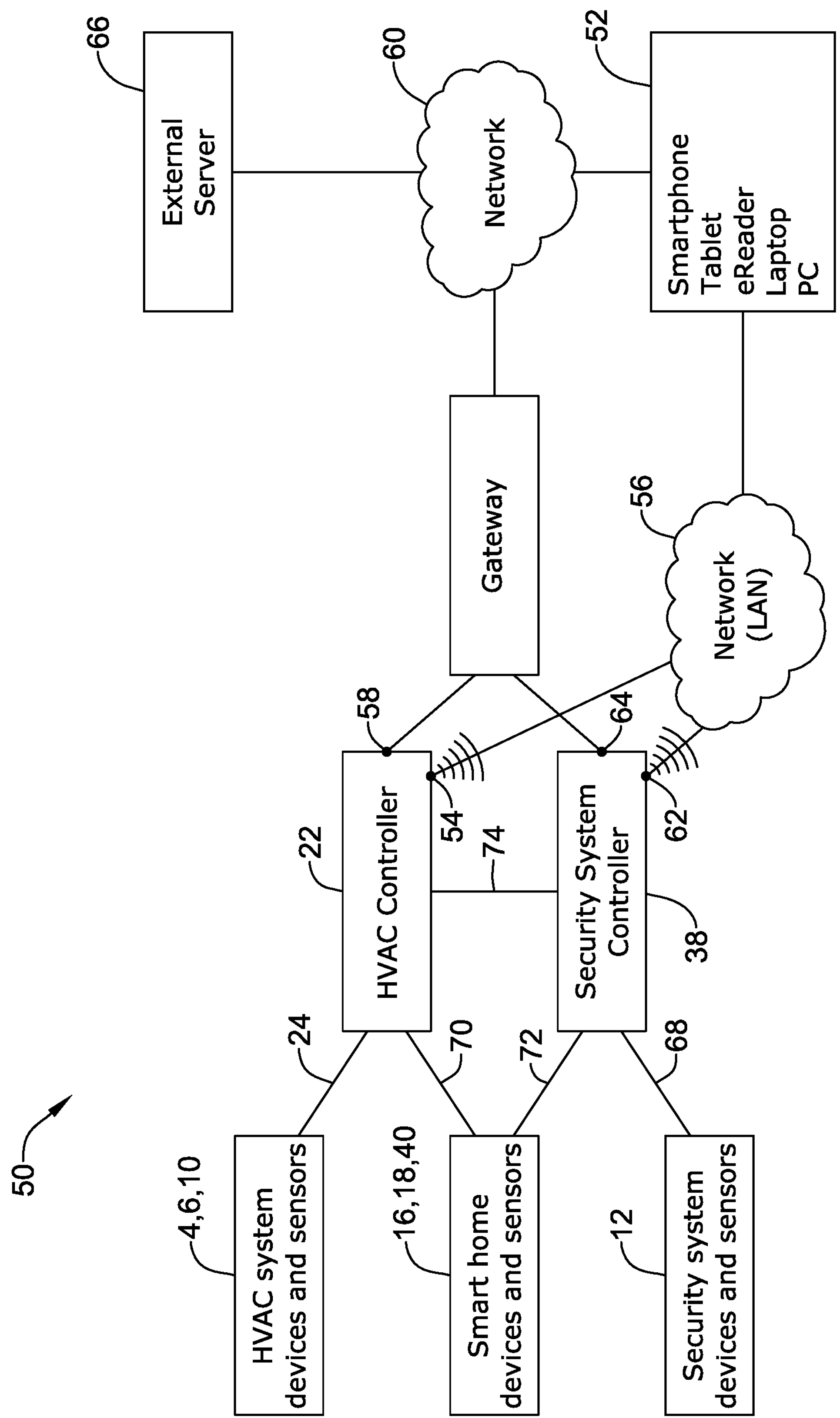
FIG. 2 is a schematic block diagram of an illustrative home or building automation system in communication with illustrative external devices and networks.

FIG. 2 is a schematic view of a home automation system 50 that facilitates remote access to, control of, and/or external communication to/from the HVAC system 4, the security system 14, and/or other home automation devices 16, 18, 40 shown in FIG. 1. The home automation system 50 may be considered a building control system or part of a building control system. The illustrative home automation system 50 includes an HVAC controller, for example, controller 22 (see FIG. 1), that is configured to communicate with and control one or more HVAC components 6 of the HVAC system 4 and a security system controller 38 (see FIG. 1) that is configured to communicate with and control one or more security sensors and/or devices 12. As discussed above, the controllers 22, 38 may be provided as separate and discrete control units or combined into a single control unit, as desired. Further, while not explicitly shown, the smart home devices and sensors 16, 18, 40 may communicate with control programs or controllers which in turn communicate with the HVAC controller 22 and/or security system controller 38. Alternatively, the smart home devices and sensors 16, 18, 40 may be configured to communicate directly with the HVAC controller 22 and/or security system controller 38.

The HVAC controller 22 may communicate with the one or more HVAC components 6 of the HVAC system 4 via a wired or wireless link 24 and with the smart home devices and sensors 16, 18, 40 (and/or the control programs thereof) via a wired or wireless link 70. Similarly, the security system controller 38 may communicate with one or more security sensors and/or devices 12 via a wired or wireless link 68 and with the smart home devices and sensors 16, 18, 40 (and/or the control programs thereof) via a wired or wireless link 72. If provided separately, it is not required for both the HVAC controller 22 and the security system controller 38 to be in communication with the smart home devices and sensors 16, 18, 40 (and/or the control programs thereof). For example, the HVAC controller 22 and the security system controller 38 may be in communication with one another via a wired or wireless link 74 such that information may be passed between the HVAC controller 22 and the security system controller 38.

Additionally, the controllers 22, 38 may communicate over one or more wired or wireless networks that may accommodate remote access and/or control of the controllers 22, 38 via another device 52 such as a smart phone, tablet, e-reader, laptop computer, personal computer, key fob, or the like. As shown in FIG. 2, the HVAC controller 22 may include a first communications port 54 for communicating over a first network 56, and in some cases, a second communications port 58 for communicating over a second network 60. Similarly, the security system controller 38 may include a first communications port 62 for communicating over the first network 56, and in some cases, a second communications port 64 for communicating over the second network 60. In some cases, the first network 56 may be a wireless local area network (LAN), and the second network 60 (when provided) may be a wide area network or global network (WAN) including, for example, the Internet. In some cases, the wireless local area network 56 may provide a wireless access point and/or a network host device that is separate from the controllers 22, 38. In other cases, the wireless local area network 56 may provide a wireless access point and/or a network host device that is part of at least one of the controller 22, 38. In some cases, the wireless local area network 56 may include a local domain name server (DNS), but this is not required for all embodiments. In some cases, the wireless local area network 56 may be an ad-hoc wireless network, but this is not required.

In some cases, the controllers 22, 38 may be programmed to communicate over the second network 60 with an external web service hosted by one or more external web servers 66. A non-limiting example of such an external web service is Honeywell's TOTAL CONNECT™ web service. The controllers 22, 38 may be configured to upload selected data via the second network 60 to the external web service 66 where it may be collected, stored, and/or analyzed on the external web server 66. In some cases, the data may be indicative of the performance of the HVAC system 4, the security system 14, and/or the smart home devices and sensors 16, 18, 40. In other cases, the data may be indicative of building activity or lack thereof. Additionally, the controllers 22, 38 may be configured to receive and/or download selected data, settings, and/or services sometimes including software updates from the external web service over the second network 60. The data, settings and/or services may be received automatically from the web service, downloaded periodically in accordance with a control algorithm, and/or downloaded in response to a user request. In some cases, for example, the HVAC controller 22 may be configured to receive and/or download an HVAC operating schedule and operating parameter settings such as, for example, temperature set points, humidity set points, start times, end times, schedules, window frost protection settings, and/or the like from the web server 66 over the second network 60. In some instances, the controllers 22, 38 may be configured to receive one or more user profiles having at least one operational parameter setting that is selected by and reflective of a user's preferences. In still other instances, the controllers 22, 38 may be configured to receive and/or download firmware and/or hardware updates such as, for example, device drivers from the web server 66 over the second network 60. Additionally, the controllers 22, 38 may be configured to receive local weather data, weather alerts and/or warnings, major stock index ticker data, and/or news headlines over the second network 60. These are just some examples.

Depending upon the application and/or where the home automation user is located, remote access and/or control of the controllers 22, 38 may be provided over the first network 56 and/or the second network 60. A variety of remote wireless devices 52 may be used to access and/or control the controllers 22, 38 from a remote location (e.g. remote from the controllers 22, 38) over the first network 56 and/or second network 60 including, but not limited to, mobile phones including smart phones, tablet computers, laptop or personal computers, wireless network-enabled key fobs, e-readers, and/or the like. In many cases, the remote wireless devices 52 are configured to communicate wirelessly over the first network 56 and/or second network 60 with the controllers 22, 38 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, one or more application program codes (i.e., apps) stored in the memory of the remote device 52 may be used to remotely access and/or control the controllers 22, 38. Similarly, an application program code (app) may be used to remotely access and/or control the smart home devices and sensors 16, 18, 40. The application program code (app) may be provided for downloading from an external web service, such as the web service hosted by the external web server 66 (e.g., Honeywell's TOTAL CONNECT™ web service) or another external web service (e.g., ITUNES® or Google Play). In some cases, the app may provide a remote user interface for interacting with the controllers 22, 38 and/or smart home devices and sensors 16, 18, 40 at the user's remote device 52. For example, through the user interface provided by the app(s), a user may be able to change the operating schedule and operating parameter settings such as, for example, temperature set points, humidity set points, start times, end times, schedules, window frost protection settings, accept software updates and/or the like. Additionally, through the user interface provided by the app(s) the user may be able to arm and/or disarm the security system 14, view sensor status, view live or previously captured videos or still images and/or the like. Further, through the user interface provided by the app(s) the user may be able to view the status of the smart home devices and sensors 16, 18, 40, change a state of the smart home devices and sensors 16, 18, 40 (e.g., turn on/off), change a control parameter (e.g., a water heater temperature set point), and/or the like.

Communications may be routed from the user's remote device 52 to the web server 66 and then, from the web server 66 to the appropriate controller 22, 38. In some cases, communications may flow in the opposite direction such as, for example, when a user interacts directly with the controllers 22, 38 to change an operating parameter setting such as, for example, a schedule change or a set point change, or an association of a security system sensor 12 with an arming mode, etc. The change made at the appropriate controller 22, 38 may then be routed to the web server 66 and then from the web server 66 to the remote device 52 where it may reflected by the application program(s) executed by the remote device 52. In some cases, one or both controllers 22, 38 may be used to change an operating parameter in the smart home devices and sensors 16, 18, 40.

In other cases, a user may be able to interact with the controllers 22, 38 via a user interface provided by one or more web pages served up by the web server 66. The user may interact with the one or more web pages using a variety of interne capable devices to effect a change at the controllers 22, 38 as well as view usage data and energy consumption date related to the usage of the HVAC system 4, security events or status related to the security system 12, and/or information regarding the smart home devices and sensors. In still yet another case, communication may occur between the user's remote device 52 and the controllers 22, 38 without being relayed through a server. These are just some examples.

Figure 3:
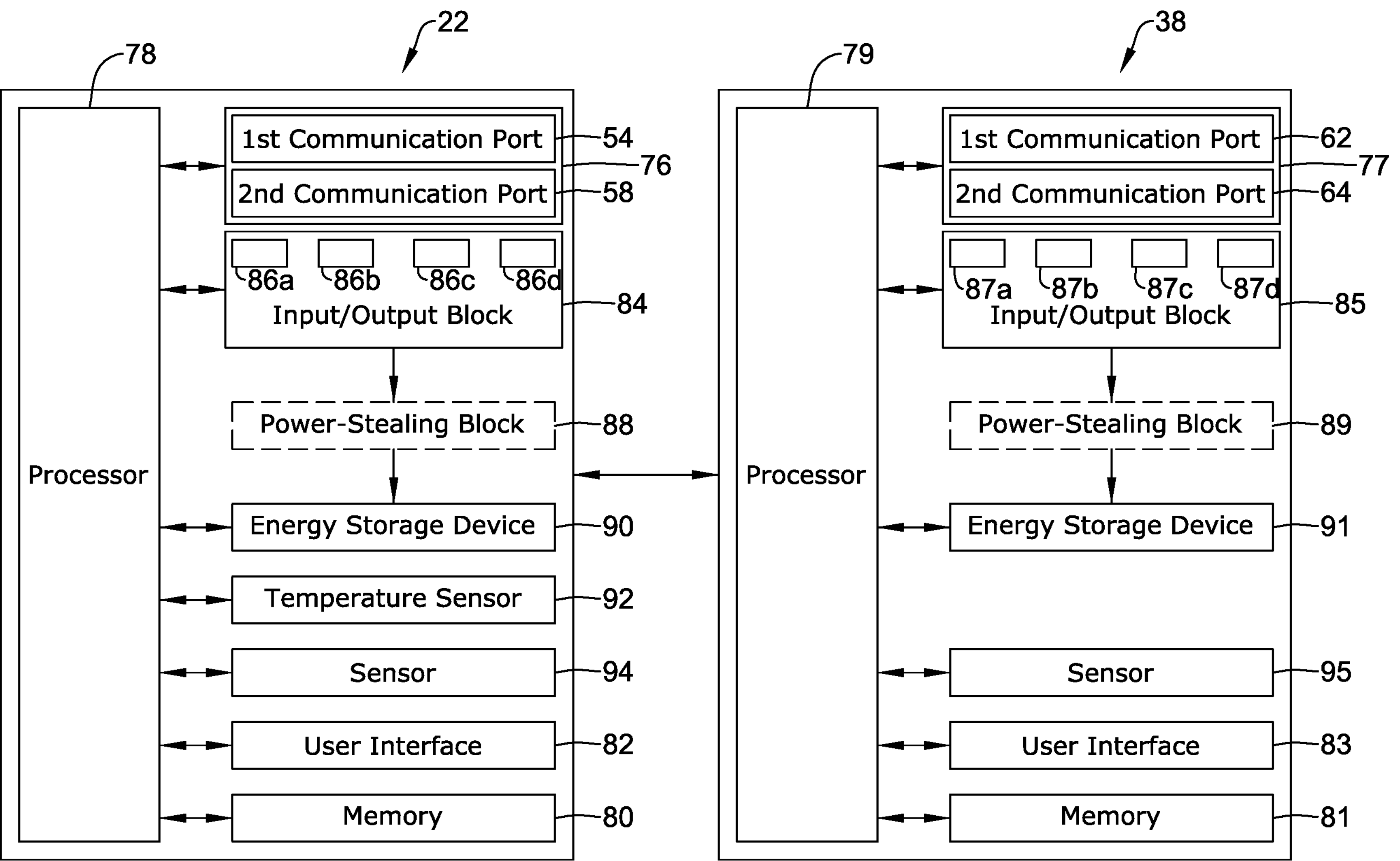
FIG. 3 is a schematic block diagram of first and second illustrative controllers.

FIG. 3 is an illustrative schematic block diagram of the HVAC controller 22 in communication with the security system controller 38 of FIG. 2. As discussed above with reference to FIG. 2, the HVAC controller 22 and/or the security system controller 38 may be accessed and/or controlled from a remote location over the first network 56 and/or the second network 60 using a remote wireless device 52 such as, for example, a smart phone, a tablet computer, a laptop or personal computer, a wireless network-enabled key fob, an e-reader, and/or the like. In some instances, the HVAC controller 22 may be a thermostat, but this is not required. As shown in FIG. 3, the HVAC controller 22 and the security system controller 38 may each include a communications block 76, 77 having a first communications port 54, 62 for communicating over a first network (e.g., a wireless LAN) and a second communications port 58, 64 for communicating over a second network (e.g., a WAN or the Internet). The first communications port 54, 62 can be a wireless communications port including a wireless transceiver for wirelessly sending and/or receiving signals over a first wireless network 56. Similarly, the second communications port 58, 64 may be a wireless communications port including a wireless transceiver for sending and/or receiving signals over a second wireless network 60. In some cases, the second communications port 58, 64 may be in communication with a wired or wireless router or gateway for connecting to the second network, but this is not required. In some cases, the router or gateway may be integral to (e.g., within) the HVAC controller 22 and/or the security system controller 38 or may be provided as a separate device. Additionally, the illustrative HVAC controller 22 and the security system controller 38 may each include a processor (e.g. microprocessor, microcontroller, etc.) 78, 79 and a memory 80, 81. The HVAC controller 22 and the security system controller 38 may each also include a user interface 82, 83, but this is not required. In some cases, only one of the HVAC controller 22 or the security system controller 38 may be provided with a user interface 82, 83. In some cases, one or both of the HVAC controller 22 and the security system controller 38 may include a timer (not shown). The timer may be integral to the processor 78, 79 or may be provided as a separate component. The respective memory 80, 81 of the illustrative HVAC controller 22 and the security system controller 38 may be in communication with the respective processor 78, 79. The memory 80, 81 may be used to store any desired information, such as the aforementioned control algorithm, set points, schedule times, diagnostic limits such as, for example, differential pressure limits, delta T limits, security system arming modes, and the like. The memory 80, 81 may be any suitable type of storage device including, but not limited to, RAM, ROM, EPROM, flash memory, a hard drive, and/or the like. In some cases, the processor 78, 79 may store information within the memory 80, 81, and may subsequently retrieve the stored information from the memory 80, 81.

In many cases, the HVAC controller 22 may include an input/output block (I/O block) 84 having a number of wire terminals (e.g. 86*a*-86*d*) for receiving one or more signals from the HVAC system 4 and/or for providing one or more control signals to the HVAC system 4. For example, the I/O block 84 may communicate with one or more HVAC components 6 of the HVAC system 4. The HVAC controller 22 may have any number of wire terminals for accepting a connection from one or more HVAC components 6 of the HVAC system 4. However, how many wire terminals are utilized and which terminals are wired is dependent upon the particular configuration of the HVAC system 4. Different HVAC systems 4 having different HVAC components and/or type of HVAC components 6 may have different wiring configurations. As such, an I/O block 84 having four wire terminals, as shown in FIG. 3, is just one example and is not intended to be limiting. In some cases, the I/O block 84 may be configured to receive wireless signals from one or more HVAC components 6 or sensors 10. Alternatively, or in addition to, the I/O block 84 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device. It is further contemplated that the I/O block 84 may communicate with another controller which controls a separate building control system, such as, but not limited to the security system controller 38.

Similarly, the security system controller 38 may include an input/output block (I/O block) 85 having a number of wire terminals (e.g. 87*a*-87*d*) for receiving one or more signals from the security system 12 and/or for providing one or more control signals to the security system 12. For example, the I/O block 85 may communicate with one or more sensors 12 of the security system 14. The security system controller 38 may have any number of wire terminals for accepting a connection from one or more sensors 12 of the security system 14. However, how many wire terminals are utilized and which terminals are wired is dependent upon the particular configuration of the security system 14. As such, an I/O block 85 having four wire terminals, as shown in FIG. 3, is just one example and is not intended to be limiting. In some cases, the I/O block 85 may be configured to receive wireless signals from one or more security sensors 12. Alternatively, or in addition to, the I/O block 85 may communicate with another controller, which is in communication with one or more controllers which controls a separate building control system, such as, but not limited to the HVAC controller 22.

In some cases, a power-transformation block 88, 89 may be connected to one or more wires of the I/O block 84, 85, and may be configured to bleed or steal energy from the one or more wires of the I/O block 84, 85. The power bled off of the one or more wires of the I/O block may be stored in an energy storage device 90, 91 that may be used to at least partially power the HVAC controller 22 or the security system controller 38. In some cases, the energy storage device 90, 91 may be capacitor or a rechargeable battery. In addition, the HVAC controller 22 and/or the security system controller 38 may also include a back-up source of energy such as, for example, a battery that may be used to supplement power supplied to the HVAC controller 22 or the security system controller 38 when the amount of available power stored by the energy storage device 90, 91 is less than optimal or is insufficient to power certain applications. Certain applications or functions performed by the HVAC controller 22 or the security system controller 38 may require a greater amount of energy than others. If there is an insufficient amount of energy stored in the energy storage device 90, 91, then, in some cases, certain applications and/or functions may be prohibited by the processor 78, 79.

The HVAC controller 22 may also include one or more sensors such as for example, a temperature sensor, a humidity sensor, an occupancy sensor, a proximity sensor, and/or the like. In some cases, the HVAC controller 22 may include an internal temperature sensor 92, as shown FIG. 3, but this is not required. The HVAC controller 22 may also communicate with one or more remote temperature sensors, humidity sensors, and/or occupancy sensors 10 located throughout the building or structure. Additionally, the HVAC controller may communicate with a temperature sensor and/or humidity sensor located outside of the building or structure for sensing an outdoor temperature and/or humidity if desired.

In some cases, the HVAC controller 22 may include a sensor 94 that is configured to determine if a user is in proximity to the building controller. Similarly, the security system controller 38 may include a sensor 95 that is configured to determine if a user is in proximity to the security system controller 38. In some cases, the sensor 94, 95 may be a motion sensor or a proximity sensor such as, for example, a passive infrared (PIR) sensor. In certain cases in which the sensor 94, 95 is a motion sensor or a proximity sensor, the sensor 94, 95 may be located remotely from the HVAC controller 22 and/or the security system controller 38 and may be in wireless communication with the HVAC controller 22 and/or the security system controller 38 via one of the communication ports.

In yet another example, the sensor 94, 95 may be configured to determine that the user is in proximity to or is expected to be in proximity to the HVAC controller 22 and/or the security system controller 38 upon detecting that the user's remote device 52 is connected to the building's wireless network which, in some cases, may be the same network to which the HVAC controller 22 and/or the security system controller 38 is also connected. Such functionality is shown and described in U.S. Patent Publication No. 2014/0031989 entitled "HVAC CONTROLLER WITH WIRELESS NETWORK BASED OCCUPANCY DETECTION AND CONTROL", the entirety of which is incorporated by reference herein for all purposes.

In still other cases, the user's remote device 52 may be configured to determine that a user is in proximity to the HVAC controller 22 and/or the security system controller 38 upon sensing a user's interaction with the HVAC controller 22 and/or the security system controller 38 via the user interface provided at the HVAC controller 22 and/or the security system controller 38. For example, the sensor 94, 95 may be configured to sense when the screen of the user interface 82, 83 is touched and/or when a button provided at the user interface 82, 83 is pressed by a user. In some cases, the sensor 94, 95 may be a touch sensitive region provided on the user interface 82, 83 when the user interface 82, 83 incorporates a touch screen display. In other cases, the sensor 94, 95 may be associated with a hard button or soft key that is provided separate from a display of the user interface 82, 83.

In some cases, upon detecting or determining that a user is in proximity to the HVAC controller 22 and/or the security system controller 38, the sensor 94, 95 may deliver a signal to the processor 78, 79 indicating that the user is in proximity to the HVAC controller 22 or the security system controller 38. In other cases, upon detecting or determining that a user is in proximity to the HVAC controller 22 or the security system controller 38, the sensor 94, 95 may be configured to transmit a signal to a remote server 66 over a second network 60 via the communications block 76, 77.

The user interface 82, 83, when provided, may be any suitable user interface that permits the HVAC controller 22 or the security system controller 38 to display and/or solicit information, as well as accept one or more user interactions with the HVAC controller 22 or the security system controller 38. For example, the user interface 82, 83 may permit a user to locally enter data such as temperature set points, humidity set points, starting times, ending times, schedule times, diagnostic limits, responses to alerts, associate sensors to alarming modes, and the like. In one example, the user interface 82, 83 may be a physical user interface that is accessible at the HVAC controller 22 or the security system controller 38, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface 82, 83 may be a touch screen LCD panel that functions as both display and keypad. The touch screen LCD panel may be adapted to solicit values for a number of operating parameters and/or to receive such values, but this is not required. In still other cases, the user interface 82, 83 may be a dynamic graphical user interface.

In some instances, the user interface 82, 83 need not be physically accessible to a user at the HVAC controller 22 or the security system controller 38. Instead, the user interface 82, 83 may be a virtual user interface 82, 83 that is accessible via the first network 56 and/or second network 60 using a mobile wireless device such as one of those remote devices 52 previously described herein. In some cases, the virtual user interface 82, 83 may be provided by an app or apps executed by a user's remote device for the purposes of remotely interacting with the HVAC controller 22 or the security system controller 38. Through the virtual user interface 82, 83 provided by the app on the user's remote device 52, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the HVAC controller 22 or the security system controller 38 via a user interface 82, 83 provided by an app on the user's remote device 52 may be first transmitted to an external web server 66. The external web server 66 may receive and accept the user inputs entered via the virtual user interface 82, 83 provided by the app on the user's remote device 52, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

Rather than a dedicated app, the virtual user interface 82, 83 may include one or more web pages that are transmitted over the second network 60 (e.g. WAN or the Internet) by an external web server (e.g. web server 66). The one or more web pages forming the virtual user interface 82, 83 may be hosted by an external web service and associated with a user account having one or more user profiles. The external web server 66 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

In some cases, a user may use either the user interface 82, 83 provided at the HVAC controller 22 or the security system controller 38 and/or a virtual user interface 82, 83 as described herein. The two types of user interfaces 82, 83 that may be used to interact with the HVAC controller 22 or the security system controller 38 are not mutually exclusive of one another. However, in some cases, a virtual user interface 82, 83 may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

Figure 4:
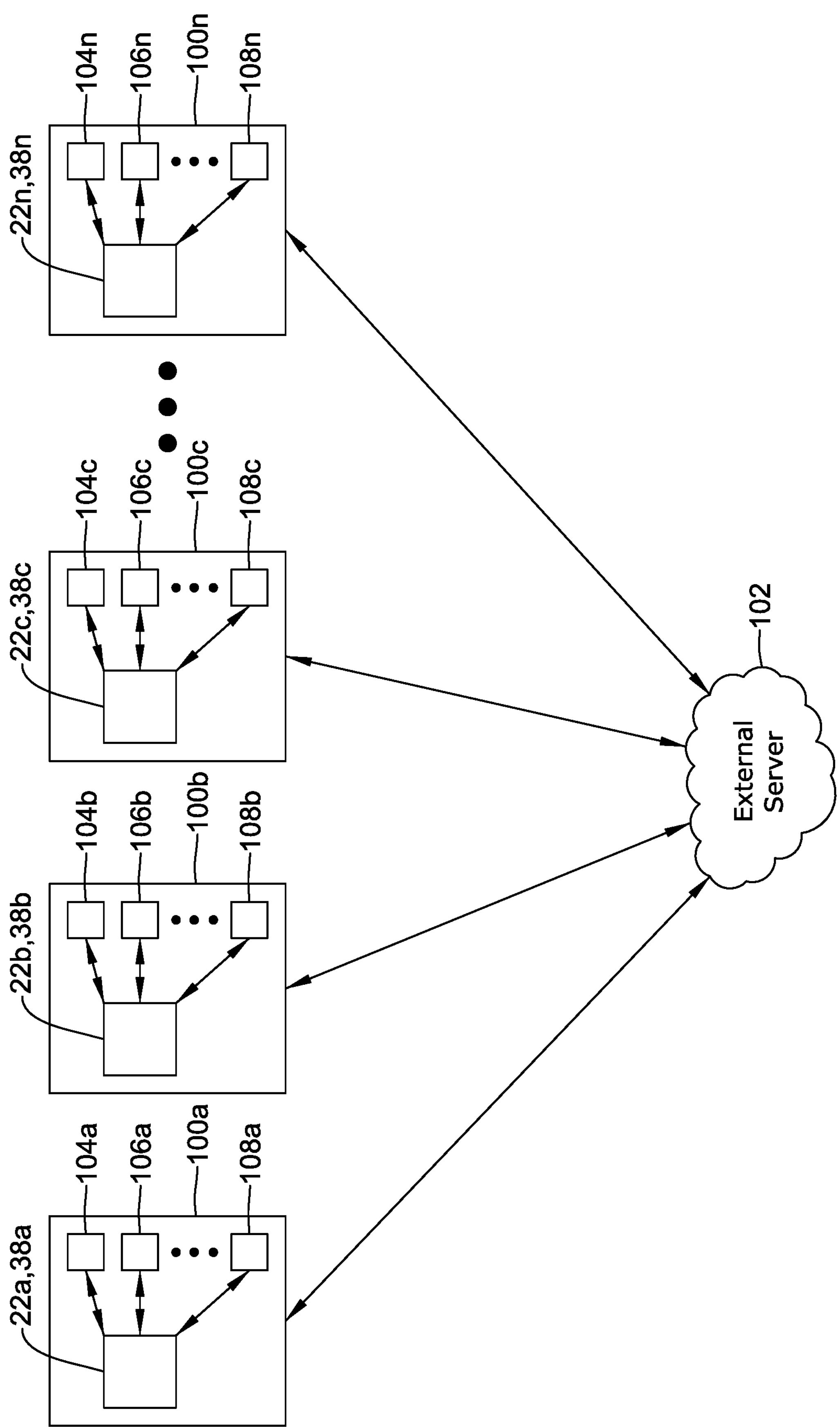
FIG. 4 is a schematic block diagram of a plurality of controllers in communication with an external server.

FIG. 4 is a schematic diagram of a plurality of buildings 100*a*, 100*b*, 100*c*, 100*n* (collectively, 100) each having one or more HVAC controllers 22*a-n* and/or security system controllers 38*a-n* in communication with an external web server 102, such as the external web server 66 described herein. It is contemplated that devices from any number of buildings 100 may be providing information to the external server 102. In some cases, hundreds, thousands, tens of thousands, or more buildings may be in communication with the external web server 102. The buildings 100*a-n* may each have one or more of: an HVAC system 104*a-n*, a security system 106*a-n*, or a smart home device, appliance, or sensor 108*a-n* such as any of those described above with respect to FIG. 1. The HVAC system 104*a-n*, security system 106*a-n*, and/or smart home devices 108*a-n* may be in communication with the HVAC controller 22*a-n*, security system controller 38*a-n*, a combined HVAC and security controller, or other controller configured to operate the systems and devices within the respective building 102*a-n*. The controllers 22*a-n*, 38*a-n* from each building may then relay performance data, operating parameters, alarm conditions, gas and/or electricity usage, etc. to the external server 102. In some cases, the data may be relayed through a WAN to the external server 102. In some cases, the external server 102 may be configured to aggregate the data obtained from the individual buildings 100. As will be described in more detail herein, once aggregated, the data can be analyzed for trends, to identify outliers, to improve algorithms, etc.

It is contemplated that the HVAC sensors 10, security system sensors 12, and/or smart home devices and sensors 16, 18, 40 may be utilized to monitor the health of a building and/or components thereof. Generally, the HVAC sensors 10, security system sensors 12, and/or smart home devices and sensors 16, 18, 40 may be analyzed to determine if there are any conditions present which may result into damage to the building and/or items within the building. If a condition is present which may result in some type of damage or health concern, the system may notify the user of the detected issue. This may allow a user to correct building and/or device issues before they become larger and/or more expensive problems.

Figure 5:
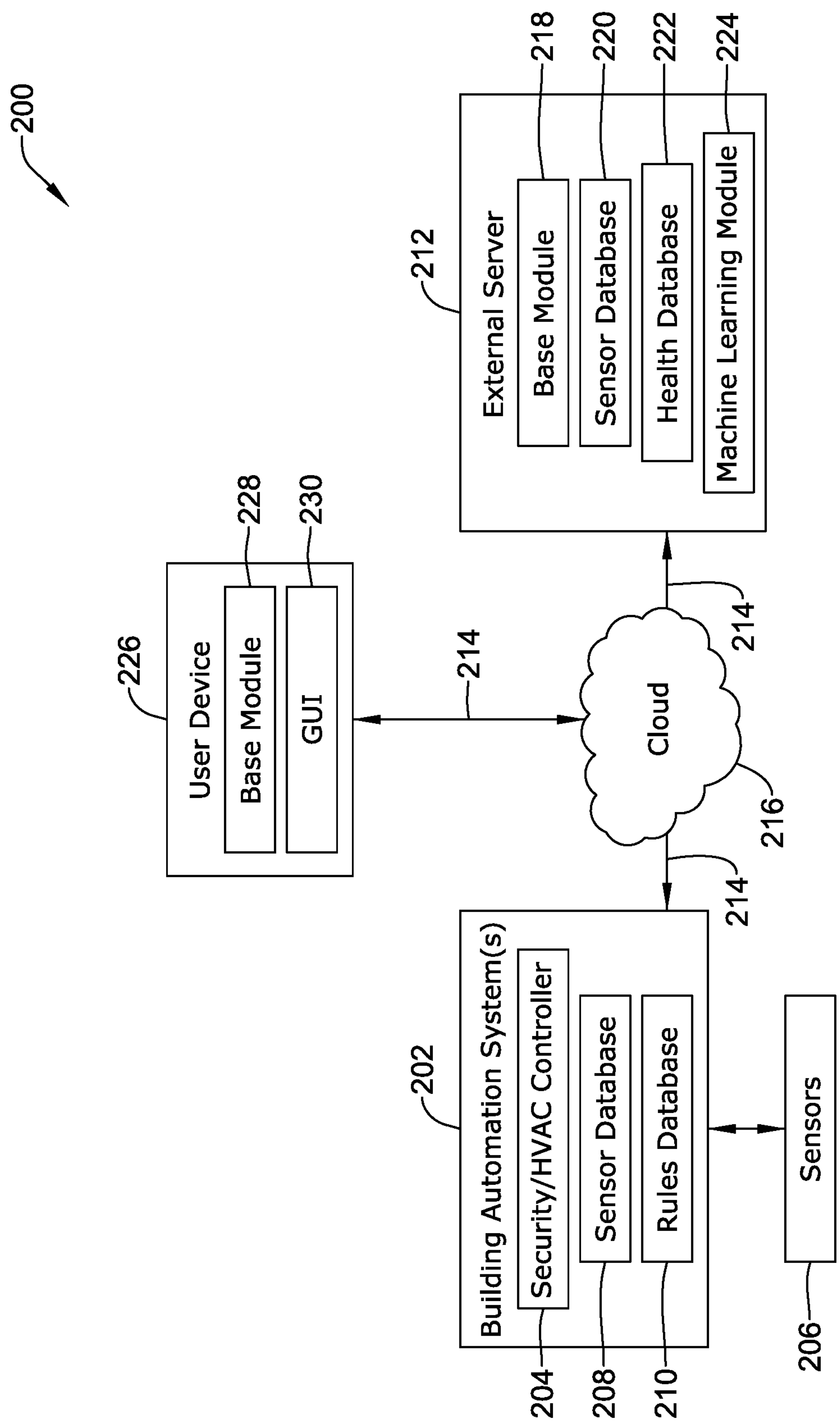
FIG. 5 is schematic block diagram of a building monitoring system.

FIG. 5 is a block diagram of an illustrative building health analysis and management system 200. The system 200 may include one or more building automation systems 202 positioned within or around a building or residence. The building automation system(s) 202 may include, but are not limited to, an HVAC system, a lighting control system, a fire suppression systems, a security system, internet enabled or "smart" devices, etc. The building automation system(s) 202 include at least one controller 204, such as, but not limited to, an HVAC controller 22 and/or a security system controller 38 described herein. The controller 204 may be similar in form and function to the controllers 22, 38 described above and include the same or similar components and capabilities. The controller 204 is configured to be in communication with one or more sensors 206 that may be used to detect a condition within or near a space of the building having the building automation system(s) 202. The sensors 206 may be any type of sensor, device (including IoT devices), or detectable event suitable for operation in or use within a building automation system. The sensors 206 may include, but are not limited to, temperatures sensors, humidity sensors, carbon dioxide sensors, occupancy sensors, proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

The building automation system(s) 202 may maintain a first, or building, database 208 of data (e.g., sensed conditions) obtained from the one or more sensors 206. For example, a memory accessible by the processor of the controller 204 may be configured to store the database 208 of sensor data such that historical and current sensor data is readily accessible. The building automation system(s) 202 may maintain a second, or problem, database 210 including a set of rules or algorithms that may be used to identify certain conditions within or near the building or residence determine if there is an issue (such as, but not limited to, high humidity which may result in mold) within or at the building which should be addressed. A set of rules may include at least one rule, two or more rules, three or more rules, etc. Each rule may define one or more events that include one or more detectable conditions that when present may be indicative of an issue (e.g., a maintenance or control issue or any condition which may present a current or future problem to the owner) within the building or building automation system 202. The one or more detectable or sensed condition are indicative of a condition of the space or of one or more of the devices in the building automation system 202 and may be data available from any of, but not limited to, the sensors 206 described herein. The space or device may be interior to a home or exterior to the home, as desired. The issues may be related to potential damage in the building such as, but not limited to damage from excess humidity, low humidity, low temperatures, high temperatures poor ventilation, fire, gas leaks, underperforming equipment, etc. A memory accessible by the processor of the controller 204 may be configured to store the rules or problem database 210 such that the rules and algorithms are readily accessible.

The problem database 210 may be downloaded onto the controller 204 located within the residence from a health database 222 located in an external server(s) 212 over a network 214. The network 214 may be a wide area network or global network (WAN), such as the internet. The external server(s) 212 may be a suite of hardware and software which may sometimes be referred to as "the cloud." In some cases, the communication may pass through an intermediary server 216 or cloud network, but this is not required. In some cases, the cloud 216 may provide the ability for communication amongst the home automation system(s) 202, the external server(s) 212, and/or one or more remote devices 226. While the external server(s) 212 is illustrated as connected to a single building having a building automation system(s) 202, the external server(s) 212 may be connected to a plurality of building automation systems as described with respect to FIG. 4. The external server(s) 212 may collect and store data from the various sensors 206 from the one or more connected home automations systems 202. The data from the sensors 206 may be collected by a base module or controller 218 and stored in a sensor database 220 at the external server(s) 212. In some cases, sensor data as well as information regarding the house or building may be stored in the sensor database 220 within the server(s) 212. Some illustrative data regarding the house or building may include, but is not limited to, location, size, age, occupancy, age of comfort control system devices, etc. As will be described in more detail herein, the base module 218 and/or a machine learning module 224 may be controllers or other modules programmed or configured to analyze the sensor data and determine if the rules stored in the health database 222 need to be or would be improved by updating. Additionally, or alternatively, the machine learning module 224 may be configured to store alerts sent to a user and/or first responder along with the corresponding sensor data that triggered the recommendation. This data may be analyzed to determine if adjustments to the rules in the health database 222 should be made.

Returning to the home automation system(s) 202, the sensor data may be analyzed to determine if a condition is present that may create issues or problems within the building. For example, in one illustrative embodiment, the sensor data may be analyzed for conditions which left unmanaged may cause damage in the building (including, but not limited to, mold growth, damage to floors or windows, frozen pipes, first, gas leaks, condensation, etc.) It is contemplated that certain conditions when left unmanaged may result in conditions which are hazardous to the occupants of the building and/or expensive to remedy. It is further contemplated that sensor data may be analyzed to identify conditions which may indicate a potential problem with the components of the building automation system(s) 202. One or more rules may be present which define conditions or combinations of detected conditions that will define an alert condition in which a notification is sent to a user.

In some cases, the processing of the sensor data and comparison of the data to the health database 210 may be performed in the cloud 216 or remote from the controller 204, although this is not required. If the data from the sensors 206 indicates that one or more conditions have occurred which may indicate a current or future problem within the building and/or building automation system 202 (as determined by comparing the data to the health database 210), the controller 204 determines that a recommendation or notification should be sent to the user via a remote user device 226.

The remote device 226 may be any internet connected device including a smart phone, tablet, e-reader, laptop computer, personal computer, etc. The notification may be received by an application program code (app) or other module 228 within the remote device 226. It is contemplated that the user may customize who or what device receives notifications and when through the user app 228 or controller 204. For example, the home automation system 202 may be in communication with more than one user and/or more than one user device. Once the notification has been received at the base module 228, the notification may be displayed on a user interface 230 of the device 224. In some cases, an audio alert (e.g., a beep or chime) or a haptic alert (e.g., a vibration) may accompany the notification to alert the user of the notification. It is contemplated that the health database 210 for a particular building may be tailored to the particular building. For example, the health database 210 may include a plurality of rules established for a building geographical area (e.g., climate), building automation system equipment, etc. For example, a building in a dry, arid environment may be less concerned about excess humidity. The network health database 222 may include a plurality of different rules sets tailored to different building characteristics. The appropriate set of rules may be downloaded to the controller 204 in response to a user identifying the details of the building to the controller 204. The user may enter household details at the user interface of the controller 204, through a remote device, or through a web client, as described above.

Figure 6:
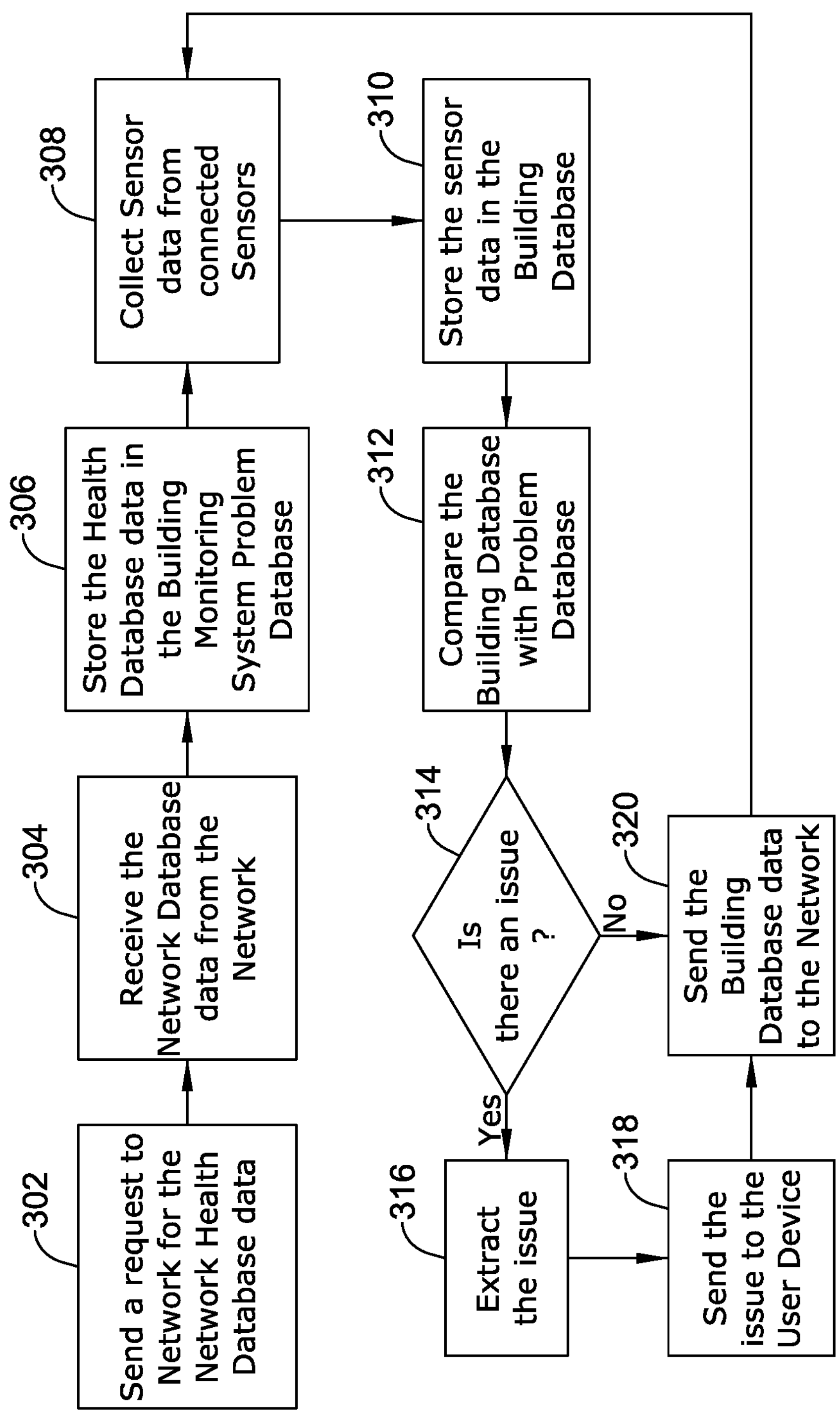
FIG. 6 is a flow chart of an illustrative method for monitoring a health status of a building.

FIG. 6 illustrates a flow chart 300 of an illustrative method for determining if one or more conditions are present which may indicate if a current issue is occurring or a future issue is likely to occur and if a notification should be issued. To begin, the user may use the controller 204 (or a remote device 224) to send a request to the external server(s) 212 to obtain the problem database 210 including the rules, as shown at block 302. Alternatively, or additionally, the controller 204 may be configured to automatically request information from the health database 222 including the rules and/or the recommendations database. The user may provide information related to the building along with the request. The external server(s) 212 may determine which particular set of rules in the network health database 222 most closely align with the characteristics of the user's building or house. The external server(s) 212 may then send the appropriate set of rules and recommendations back to the controller 204, as shown at block 304. The rules received at the controller 204 may be stored within the problem database 210 in the controller 204 or in a remote location (e.g., a cloud network), as shown at block 306. In some cases, the health database including the rules and the recommendations database may be combined into a single database at the controller 204 and/or remote location, as desired. It is contemplated that the user may initiate a request for rules or updated rules on demand or as desired. Alternatively, or additionally, the controller 204 may be configured to automatically request the most up-to-date rules from the external server(s) 212 at predetermined time schedules. It is further contemplated that additionally, or alternatively, the external server(s) 212 may be configured to automatically send or push revised rules to the controller 204 as the rules are updated. For example, the external server(s) 212 may keep a log of which controller 204 has which set of rules. As individual sets of rules are updated in response to user feedback, alarm conditions, or machine learning, the external server(s) 212 may automatically deliver the revised rules to the controller 204.

The controller 204 may collect data from one or more sensors 206, as shown at block 308. It is contemplated that the controller 204 may be configured to collect data in response to a particular event, such as, but not limited to, receiving a diagnostics request. Alternatively, or additionally, the sensors 206 may continually collect data. The sensors 206 may be configured to sense a condition within the building or a particular room of the building. Some illustrative conditions may include, but are not limited to, humidity, temperature, ventilation, detection of gas, detection of smoke or fire, etc. As the controller 204 collects data from the one or more sensors 206, the data is stored in the building database 208, as shown at block 310. The sensor database 208 may be integral to the controller 204 or may be stored in a cloud network 214, as desired.

Referring briefly to FIG. 7, which illustrates an example building database 400, the building database 400 may record additional information beyond the measured or perceived parameter. The building database 400 may record the system or building identification 402. The building identification 402 may tie the data to a particular controller 204 such that data can be aggregated with other systems having similar building characteristics. For example, base module 218 and/or the machine learning module 224 of the external server(s) 212 may link home automations systems 202 have similar building characteristics (although other criteria may be used, as desired) such that the data can be aggregated correctly and used to refine the appropriate set of rules, as will be described in more detail herein. The building database 400 may also record the data 404 and the time 406 the sensor data was obtained. In some cases, a length of time a reading is valid may also be recorded. Additionally, the building database 400 may also record the name 408 of the sensor 206. While not explicitly shown, the building database 400 may also record the location of the sensor 206. This may allow different rules to be applied to specific sensors 206. For example, humidity sensors may be placed specifically in more than one location where humidity is known to generate problems. The building database 400 also records the actual data 410 received from the sensor 206. The data may be binary (e.g., on/off, yes/no, etc.) or a numerical value.

Returning to FIG. 6, the sensor database 208 may be compared to the problem database 210, as shown at block 312. It is contemplated that the storage of information and the processing thereof may be performed within the controller 204, within a dedicated module in the controller 204, or remotely from the controller 204, as desired. This may be performed at predefined time intervals or in response to a particular sensor reading, or other triggering event. As the sensor database 208 is compared to the problem database 210, the controller 204 determines if data in the sensor database 208 aligns with any rules in the problem database 210 which indicate an issue may be present, as shown at block 314. If there is not an issue, the data from the sensor database 208 may be sent to the external server(s) 212, as shown at block 320, and the collection of sensor data (block 308), storage of sensor data (block 310), and comparison of collected data to rules (block 312) will continue. In other words, the rules will be repeatedly applied to the collected data to identify when a rule defined event occurs.

Returning to block 314, if an issue is present, the issue may be extracted from the problem database 210, as shown at block 316. The controller 204 may then send a message or notification to including the event and/or the potential issue to the user device, as shown at block 318. After notification of the user, or substantially simultaneously therewith, the sensor database 208 may be sent to the external server(s) 212, as shown at block 320, where it is stored and can be used to improve the network health database 222. Additionally, or alternatively, the user may provide feedback regarding the issue that prompted the notification. For example, the user may change the data range in the building database 210 for the event which triggered the notification. It is contemplated that the user may adjust the data range in the building database 210 without an event prompting a notification. In some cases, the external server(s) 212 may be configured to poll the controller 204 for sensor data without a notification event.

FIG. 8 illustrates an example system problem database 450. The network health database 222 may be similar to the system rules database but may include additional rules or sets of rules which may not be applicable to a particular building automation system 200. The problem database 450 illustrated in FIG. 8 is not intended to provide a complete listing of the events which may result in the issuance of a notification to the user. Instead, the problem database 700 is provided as an example of some rules that may be generated for monitoring the health of a building and/or equipment therein. The problem database 450 may include a device or sensor name and/or location 452, the data from said device 454, a time frame or time range for the data to match the predefined value 456, and the issue that may occur 458. Each row 460*a-f* (collectively, 460) of the problem database 450 may be a rule defining one or more events and a corresponding issue.

In some cases, the data from a single device meeting a predetermined criteria may be sufficient to generate an alert. In other cases, the combined data from two or more sensors or devices meeting predetermined criteria may generate a recommendation. Some events that may result in the issuance of a notification to a user may include, but are not limited to, humidity above a predetermined threshold for any length of time (or a lower threshold for a predetermined length of time), an indoor temperature below a threshold value alone or in combination with low humidity, deactivated ventilation with a humidity above a predetermined threshold, a predetermined difference in temperature in an air duct, detection of fire, detection of a gas (e.g., carbon monoxide, natural gas, etc.). It should be understood that the above listing of conditions is not intended to be comprehensive but rather illustrative of some conditions that can be monitored using a building automation system 202 to determine the health of a building and/or equipment therein. Each rule 460 may include an associated issue 458 that may occur or has already occurred due to the condition identified in the rule 460.

As described with respect to FIG. 6, the controller 204 may first compare sensor data to the building database 450. If the sensor data matches a rule 460, the issue 458 is extracted from the database. The controller 204 may then transmit a notification or message to the user deice 226 via the network 214. The notification may include the event 454 that prompted the notification as well as the problem or issue that has or may arise. In some cases, the notification may include additional information such as, but not limited, recommended actions, contact information for a local service company or handy man, etc.

Figure 9:
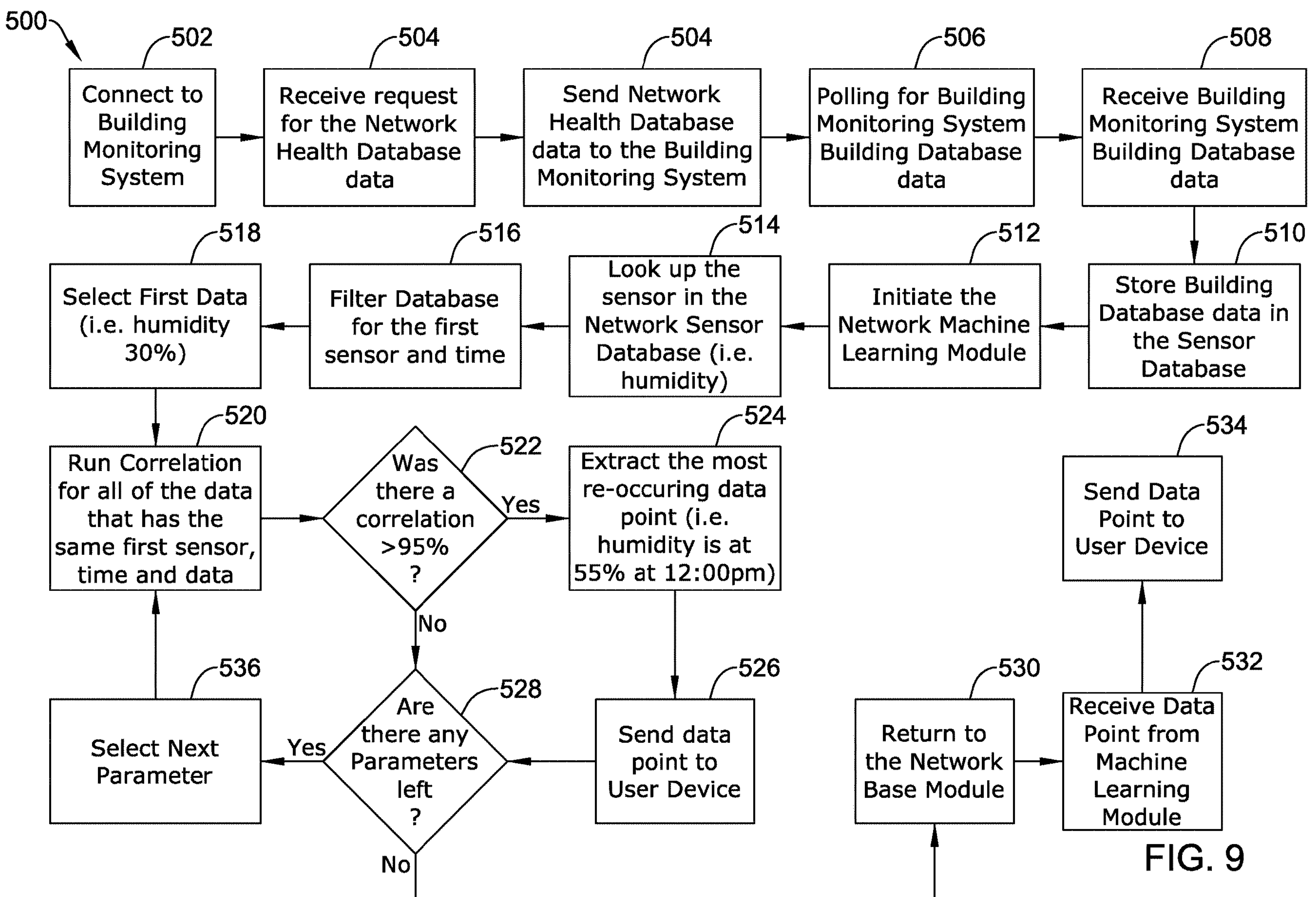
FIG. 9 is a flow chart of an illustrative method for updating and refining the network health database.

FIG. 9 illustrates a flow chart 500 of an illustrative method for updating and refining the network health database 222 located in the external server(s) 212. As described above, the network health database 222 may be developed and refined based on a network sensor database 220 that is an aggregation of one or more (e.g., as discussed with respect to FIG. 4) individual sensor or building databases 208. The process 500 may begin by the base module 218 of the external server(s) 212 connecting to and receiving a request from an individual home automation system 202 to receive the health database 222, as shown at block 502. As described herein, the base module 218 may be configured to select and send an appropriate set of rules and potential issues based on the system 202 requesting the data, as shown at block 504. The base module 218 may be configured to continuously or intermittently poll the home automations system(s) 202 for sensor data, as shown at block 506. In some cases, the home automation system(s) 202 may send the sensor data without a request from the base module 218 of the external server(s) 212. In some cases, the data collection may be performed by the base module 218. The base module 218 may receive the data from the home automation system(s) 202, as shown at block 508 and store the data in a network sensor database 220, as shown at block 510.

Referring briefly to FIG. 10, which illustrates an example network sensor database 600, the network sensor database 220 may record additional information beyond the measured or perceived parameter. The network sensor database 220 may record the system identification 602. The system identification 602 may tie the data to a particular controller 204 or unique home automation system 202 such that data can be aggregated with other systems. In some cases, the data may be aggregated with data from other systems having similar demographics, although this is not required. For example, the base module 218 and/or the machine learning module 224 of the external server(s) 212 may link home automations systems 202 having similar household characteristics (although other criteria may be used, as desired) such that the data can be aggregated correctly and used to refine the appropriate set of rules, as will be described in more detail herein. The network sensor database 220 may also record the date and 604 and time 606 the data was recorded. In some cases, a length of time a reading is valid may also be recorded. The network sensor database 220 may also record the name and/or type 608 of device 206. While not explicitly shown, the network sensor database 220 may also record the location of the sensor 206. This may allow different rules to be applied to specific sensors 206. The network sensor database 220 also records the actual data 610 received from the sensor 206. The data may be binary (e.g., on/off, yes/no, etc.) or a numerical value.

Returning to FIG. 9, after the sensor data has been stored in the network sensor database (block 510), the base module 218 may initiate the machine learning module 224, as shown at block 512. The machine learning module 224 may include one or more correlation engines to correlate the sensor data. To begin, the machine learning module 224 may look up a first sensor or device (for example, but not limited to, a humidity sensor) in the network sensor database 220, as shown at block 514. In some cases, the network sensor database 220 may be filtered for the first sensor and/or time, as shown at block 516. The machine learning module 224 may then select a particular data reading (e.g., a humidity of 30%), as shown at block 518. The machine learning module 224 may then run a correlation analysis for all of the data that has the same time recorded and data (e.g., humidity=30%), as shown at block 520. The machine learning module 224 may then determine if a there was a correlation between the first device and other parameters (e.g., time), as shown at block 522. In some cases, the parameters may be considered to be correlated if a linear regression analysis using the least squares method results in a correlation factor above a predetermined threshold. The predetermined threshold may be any threshold desired, such as, but not limited to 75% or greater (e.g., R=0.75 or greater), 85% or greater (e.g., R=0.85 or greater), 95% or greater (e.g., R=0.95 or greater), etc. These are just some examples.

If there is a correlation, the machine learning module 224 may extract the most re-occurring data point (for example, the most re-occurring data point for the humidity sensor may be 55% at 12:00 pm), as shown at block 524. The most re-occurring data point may then be sent to the user (e.g., at the controller 204 and/or the user the device 226), as shown at block 526. This may allow the user to view the most re-occurring data point for a particular sensor and/or the correlated data such that the user can adjust the rules in the health database 210 to customize the alerts for their specific needs. For example, if a humidity reading briefly spikes at a consistent time of day before promptly lowering, the user may choose to adjust the HVAC system to prevent the spike in humidity or raise the threshold of acceptable humidity levels.

Returning to block 522, if there is no correlation, the machine learning module 224 may check for other parameters that may have the same device time and data, as shown at block 528. Similarly, after a data point has been sent to the user (block 526), the machine learning module 224 may check for other parameters remaining in the sensor database 220 (e.g., temperature, air duct temperature, gas sensor, etc.), as shown at block 528. If there are no additional parameters, control may return to the base module, as shown at block 530. The base module 218 may then receive any data from the machine learning module that needs to be transmitted to the user, as shown at block 532, and send said data to the user device 226 and/or controller 204. The process may then be repeated with the base module 218 once again polling the home automation system(s) 202 for sensor data, as shown at block 506. Returning to block 528, if there are additional parameters for which a correlation has not been run, the machine learning module 224 may select the next parameter for a correlation analysis, as shown at block 536. The correlation process may then be performed on the next selected parameter, beginning at block 520. The correlation process may continue until there are no parameters left.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for monitoring a status of a building, the method comprising:

requesting, by a controller located within the building, a set of rules from a plurality of sets of rules stored in a rules database on a server, wherein each set of the plurality of sets of rules are directed to one or more buildings with aligned characteristics;

receiving, by the controller and based on characteristics of the building, a building-specific set of rules from the plurality of sets of rules stored on the server, wherein the building-specific set of rules includes one or more rules, each rule defining:

a rule defined event; and an issue that occurs in response to the rule defined event occurring over a predetermined length of time;

monitoring, by the controller within the building, one or more sensed conditions of one or more sensors in the building over time;

repeatedly applying, by the controller, the building-specific set of rules to the one or more sensed conditions of the one or more sensors to identify that the rule defined event of the building-specific set of rules has occurred over the predetermined length of time; and issuing, by the controller, a notification to a user, the notification including an identification of the rule defined event and the issue associated with the rule defined event.

2. The method of claim 1, wherein the rule defined event for at least one rule comprises a humidity reading over a threshold for the predetermined length of time.

3. The method of claim 1, wherein the rule defined event for at least one rule comprises a temperature reading over a threshold for the predetermined length of time.

4. The method of claim 1, wherein the rule defined event for at least one rule comprises a temperature reading under a threshold for the predetermined length of time in combination with a humidity under a predetermined value.

5. The method of claim 1, wherein the one or more sensors comprises one or more of a humidity sensor, a temperature sensor, a gas sensor, or a smoke detector.

6. The method of claim 1, wherein the rule defined event for at least one rule comprises a detection of a fire.

7. The method of claim 1, wherein the rule defined event comprises a detection of a gas.

8. The method of claim 1, wherein the one or more sensors include a ventilation sensor and a humidity sensors, and wherein:

the rule defined event for at least one rule comprises deactivating ventilation with a humidity reading over a threshold value.

9. The method of claim 1, wherein the one or more sensors includes a temperature sensor positioned in an air duct, and wherein:

the rule defined event for at least one rule comprises a temperature difference above a predetermined value over the predetermined time frame.

10. The method of claim 1, wherein the notification further includes a recommended action.

11. The method of claim 1, wherein the notification further includes contact information for a repair company.

12. A building monitoring system comprising:

a first sensor configured to detect a first condition in the building;

a second sensor configured to detect a second condition in the building;

an HVAC controller operably coupled to the first sensor and the second sensor, the HVAC controller comprising:

a communications port configured to communicate with an external server over a network, the communications port being configured to communicate a request for a building-specific set of rules to the external server and receive communication back from the external server including the building-specific set of rules from a plurality set of rules stored on the external server, wherein each of the plurality set of rules are directed to buildings having closely aligned characteristics; and a memory configured to store the building-specific set of rules, each rule in the building-specific set of rules configured to identify one or more issues in the building based on the at least one of the first or second conditions in the building;

wherein the HVAC controller is configured to:

apply the building-specific set of rules to the first and second detected conditions in the building to identify the one or more issues; and provide a notification to a remote device via the communications port.

13. The building monitoring system of claim 12, wherein the one or more issues include at least one of a development of mold, a build-up of condensation, a fire, a gas leak, damaged woodwork, or excess humidity.

14. The building monitoring system of claim 12, wherein the first sensor comprises a humidity sensor.

15. The building monitoring system of claim 12, wherein the second sensor comprises a temperature sensor.

16. The building monitoring system of claim 12, wherein the HVAC controller is implemented by the remote server geographically spaced from the building, and the remote device is a portable handheld device.

17. The building monitoring system of claim 16, wherein the HVAC controller is operatively coupled to the first sensor and the second sensor at least partially over the network.

18. The building monitoring system of claim 12, wherein the HVAC controller is located in the building, and the remote device is a portable handheld device.

19. A method for monitoring a status of a building, the method comprising:

requesting, from a controller located within the building, a set of rules from a plurality set of rules stored on an external server that stores a rules database including a plurality set of rules, wherein each of the plurality set of rules are directed to buildings having closely aligned characteristics;

receiving, at the controller, a building-specific set of rules from the plurality set of rules stored on the external server, wherein each rule in the building-specific set of rules defines:

a rule defined event; and an issue occurs if the rule defined event occurs over a predetermined length of time;

monitoring, with the controller, one or more sensed conditions of one or more sensors located within the building over time;

applying, iteratively with the controller, the building-specific set of rules to the one or more sensed conditions of the one or more sensors to identify when the rule defined event occurs; and issuing a notification to a user, with the controller, the notification including the rule defined event and the issue associated with the rule defined event.

* * * * *